(12) United States Patent
Matterne et al.

(10) Patent No.: US 8,332,564 B2
(45) Date of Patent: Dec. 11, 2012

(54) DATA PROCESSING APPARATUS AND METHOD FOR CONNECTION TO INTERCONNECT CIRCUITRY

(75) Inventors: Johan Matterne, Landen (BE); Martinus Cornelis Wezelenburg, Leuven-Heverlee (BE)

(73) Assignee: ARM Limited, Cambridge (GB)

( * ) Notice: Subject to any disclaimer, the term of this patent is extended or adjusted under 35 U.S.C. 154(b) by 499 days.

(21) Appl. No.: 12/588,591

(22) Filed: Oct. 20, 2009

(65) Prior Publication Data

US 2011/0093636 A1   Apr. 21, 2011

(51) Int. Cl.
*G06F 13/36* (2006.01)
(52) U.S. Cl. ........................ 710/310; 710/305
(58) Field of Classification Search .......... 710/310–315, 710/305–306, 100
See application file for complete search history.

(56) References Cited

U.S. PATENT DOCUMENTS

| | | | |
|---|---|---|---|
| 6,170,030 B1 * | 1/2001 | Bell | 710/310 |
| 2011/0035523 A1 * | 2/2011 | Feero et al. | 710/110 |

* cited by examiner

*Primary Examiner* — Tim T Vo
*Assistant Examiner* — Kim Huynh
(74) *Attorney, Agent, or Firm* — Nixon & Vanderhye P.C.

(57) ABSTRACT

A data processing apparatus has a main controller for executing a programmable sequence of instructions including a transaction sequence of instructions used to process a transaction to be initiated by the data processing apparatus. The transaction sequence of instructions is programmed dependent on the interconnect protocol. The data processing apparatus has an interconnect interface unit including a plurality of queues with at least one send queue for issuing outbound payload information to the interconnect circuitry, and at least one receive queue for receiving inbound payload information from the interconnect circuitry. An interface controller is provided for pushing the outbound payload information on to the at least one send queue and popping the inbound payload information from the at least one receive queue, under the control of commands issued by the main controller. The interconnect interface unit has an interconnect port for communicating with the interconnect circuitry.

33 Claims, 6 Drawing Sheets

DATA PROCESSING APPARATUS AND METHOD FOR CONNECTION TO INTERCONNECT CIRCUITRY

BACKGROUND OF THE INVENTION

1. Field of the Invention

The present invention relates to a data processing apparatus and method for connection to interconnect circuitry.

2. Description of the Prior Art

Within a data processing system, it is known to provide one or more resources which are shared amongst a plurality of elements of the data processing system. For example, the plurality of elements may take the form of a plurality of master devices, and the shared resource may take the form of a slave device with respect to which the various master devices can initiate transactions. Each transaction typically consists of an address transfer from a master device to a slave device, and one or more data transfers between the master device and the slave device. For a write transaction, these data transfers will pass from the master device to the slave device (in some implementations there will additionally be a write response transfer from the slave device to the master device), whilst for a read transaction these data transfers will pass from the slave device to the master device.

To enable each transaction to take place, a communication path needs to be established between the master device initiating the transaction, and the slave device to which the transaction is directed. Typically, the mechanism used to establish the communication paths between master devices and slave devices is shared amongst the various master and slave devices. For example, a data processing system may provide interconnect circuitry for coupling the various master devices and slave devices, with the interconnect circuitry providing a plurality of connection paths over which such communication paths can be established.

One type of master device which it is known to connect to an interconnect circuit is a general purpose processor, often referred to as a processor core or a central processing unit (CPU). However, another type of processing device which has been developed to provide a lower cost processing device than the general purpose processor is a processing unit optimised for handling specific processing tasks, such a processing unit being referred to herein as a data engine. Whilst a data engine may have its own dedicated resources, for example its own interrupt controller, its own Direct Memory Access (DMA) logic, etc, in other embodiments the data engine may have no local resources dedicated to it, such a data engine often being arranged to act as a pure slave device for a main processing unit such as the earlier mentioned general purpose processor. Further, as a middle ground approach, some data engines can be arranged to have access to certain resources, but with those resources being shared with other elements of the data processing system. In such embodiments, whilst those resources, or portions of those resources, may be dedicated to the data engine for a particular session (a session typically containing a group of tasks to be performed), those resources can be re-allocated in a subsequent session to other elements of the data processing system.

However the data engine is constructed, the data engine will often have a significantly reduced level of hardware when compared with the general purpose processor, with that hardware being software controlled to perform the desired specific processing tasks allocated to that data engine.

It would be desirable to enable such a data engine to be coupled to interconnect circuitry to operate as a master device with respect to the interconnect circuitry. However, interconnect circuits typically employ interconnect protocols that control the routing of traffic through the interconnect circuitry, and hence if such a data engine were to be connected to an interconnect circuit, it would need to be provided with the necessary structure at its interface to enable it to initiate transactions conforming to the interconnect protocol. Given that the interface will add functionality that is not part of the core data engine function, it would be advantageous for any such interface mechanism enabling the data engine to communicate with the interconnect circuit to have a low hardware requirement.

Further, from a flexibility standpoint, it would be desirable for any such interface mechanism to not be constrained to any particular interconnect protocol, to enable the data engine to be coupled to a variety of different interconnect circuits employing different interconnect protocols.

In the area of microcontroller technology, it is known to use software executing on the microcontroller to drive general purpose input/output pins in order to produce signals conforming to certain bus protocols, typically those associated with serial buses to which the microcontroller may be connected.

SUMMARY OF THE INVENTION

Viewed from a first aspect, the present invention provides a data processing apparatus for connection to interconnect circuitry, the data processing apparatus for acting as a master device to initiate transactions conforming to an interconnect protocol associated with the interconnect circuitry, comprising: a main controller for executing a programmable sequence of instructions including a transaction sequence of instructions used to process a transaction to be initiated by the data processing apparatus, the transaction sequence of instructions being programmed dependent on the interconnect protocol; and an interconnect interface unit comprising: a plurality of queues including at least one send queue for issuing outbound payload information to the interconnect circuitry and at least one receive queue for receiving inbound payload information from the interconnect circuitry; an interface controller for pushing the outbound payload information onto the at least one send queue and popping the inbound payload information from the at least one receive queue under the control of commands issued by the main controller when executing said transaction sequence of instructions; and an interconnect port via which the interconnect interface unit communicates with the interconnect circuitry in order to output outbound payload information from the at least one send queue and receive inbound payload information for placing on the at least one receive queue.

In accordance with the present invention, the data processing apparatus has a main controller which executes a transaction sequence of instructions in order to process a transaction, with that transaction sequence of instructions being programmed dependent on the interconnect protocol associated with the interconnect circuitry. The data processing apparatus further employs a plurality of queues within an interconnect interface unit in order to issue payload information to the interconnect circuitry and receive payload information from the interconnect circuitry during the performance of the transaction. An interface controller is then responsive to commands issued by the main controller when executing the transaction sequence of instructions to control the pushing of payload information on to the queues and popping of payload information from the queues. In addition, an interconnect port is provided via which the interconnect interface unit communicates with the interconnect circuitry in order to output outbound payload information from the at least one send queue and receive inbound payload information for placing on the at least one receive queue.

The interconnect interface unit hence provides a small level of hardware that is sufficient to allow the data processing apparatus to connect to the interconnect circuitry in order to act as a master device. Further, since the operation of that interconnect interface unit is controlled by a transaction sequence of instructions executed by the main controller, and that transaction sequence of instructions is programmed having regard to the interconnect protocol, the present invention provides a very flexible mechanism enabling the data processing apparatus to be connected to a variety of different interconnect circuits employing a variety of different interconnect protocols without any need to alter the hardware of the interconnect interface unit.

Accordingly, the present invention provides a simple, low cost, mechanism for allowing the data processing apparatus to act as a master device with respect to an interconnect circuit, whilst providing a great deal of flexibility with regard to the use of the data processing apparatus having regard to different interconnect protocols.

The data processing apparatus can take a variety of forms, but in one embodiment is formed as a data engine. The data engine may operate autonomously, or alternatively may be arranged to operate as a loosely-coupled coprocessor for a main processing unit such as a general purpose processor (the data engine being loosely coupled in the sense that it resides externally to the main processing unit and that synchronisation between the data engine and the main processing unit only takes place on a process or task level).

In one embodiment, the interconnect port operates asynchronously to the execution of said programmable sequence of instructions by the main controller, having regard to said interconnect protocol. Hence, this enables the interconnect interface unit to separate the timing of the physical transfers of payload information required over the interconnect circuitry from the timing of the instructions executed by the main controller, and hence the commands issued to the interface controller.

In one embodiment handshake signals are used to control the propagation of the outbound and inbound payload information through the interconnect circuitry, and the interconnect port provides a handshaking component for each of said plurality of queues for generating one of said handshake signals. The handshake signals can take a variety of forms, for example request/acknowledge, valid/ready, etc, but in general terms each send queue will assert a handshake signal when it has valid outbound payload information to send and each receive queue will assert a valid handshake signal when it has capacity to receive inbound payload information or is acknowledging receipt of inbound payload information. Hence, by arranging the interconnect interface unit to have at least one send queue and at least one receive queue, the required handshake signals can then be generated directly by the associated handshaking components for those queues as and when appropriate to enable the transfer of the payload information to and from the interconnect.

There are a number of ways in which the payload information can be handled by the data processing apparatus. However, in one embodiment, the data processing apparatus further comprises at least one functional unit for performing payload information processing operations under the control of commands issued by the main controller when executing said sequence of instructions. Hence, such a functional unit may generate outbound payload information under the control of appropriate commands from the main controller, and/ or may analyse inbound payload information under the control of appropriate commands from the main controller. By providing such payload information processing operations separately to the interconnect interface unit, this enables the structure of the interconnect interface unit to be kept as small as possible.

The interconnect protocol will typically define a number of properties associated with the transactions to be handled by the interconnect circuitry. Often, the interconnect protocol may define certain timing issues, that valid transactions will need to abide by. In one embodiment, the main controller is arranged, when executing said transaction sequence of instructions, to issue the commands to the interface controller such that a relative timing between the commands is dependent on the interconnect protocol. By controlling the relative timing between the commands in such a manner, there is no need for the queues to have any knowledge of interconnect protocol specific timing constraints.

There are a number of ways in which the relative timing between the commands can be achieved. However, in one embodiment, the sequence of instructions are compiled such that the individual instructions of the transaction sequence are executed at times which produce said relative timing between the commands issued to the interface controller. Hence, when compiling the sequence of instructions, such timing issues related to the interconnect protocol can be taken into account so that the individual instructions of the transaction sequence are executed at appropriate times. Purely by way of illustration, it may be known that for a particular interconnect protocol, the earliest time at which a write response may be received is ten clock cycles after the last write data value was issued. Accordingly an instruction of the transaction sequence that causes a command to be sent to the interface controller to pop the relevant receive queue in order to ascertain the presence of write response payload information may be arranged so that it is executed no earlier than ten clock cycles after the last instruction causing a command to be sent to the interface controller to push the last item of write data on to the relevant send queue.

The instructions executed by the main controller can take a variety of forms. However, in one embodiment, the sequence of instructions comprises a sequence of microcode instructions generated by a compiler for execution by the main controller. Such an approach may be used, for example, when the main controller is a data engine controller of a data engine incorporating the interconnect interface unit.

In one embodiment, the compiler generates the sequence of microcode instructions from a sequence of user defined instructions having regard to timeshape information identifying one or more timing properties of the interconnect circuitry having regard to the interconnect protocol. Hence, the user defined instructions are separated from the actual microcode instructions executed by the main controller, with the compiler using timeshape information when determining the sequence of microcode instructions to be executed, thereby enabling the compiler to take into account how the interconnect protocol dictates timing of certain events within the interconnect circuitry, and to seek to optimise the microcode sequence accordingly.

In one embodiment, each transaction comprises an address transfer issued by the master device to a slave device connected to the interconnect circuitry, and one or more data transfers between the master device and said slave device, each transfer from the master device comprising said outbound payload information, and each transfer to the master device comprising said inbound payload information.

Furthermore, in one embodiment, said outbound payload information for each address transfer comprises an address value and one or more items of control information, and said outbound or inbound payload information for each data transfer comprises a data value and one or more items of control information.

In one embodiment, the at least one send queue comprises at least one address queue onto which the interface controller is arranged to push the outbound payload information of each address transfer. In one embodiment, a single address queue can be used for both read and write transactions. However, in an alternative embodiment, the at least one address queue comprises a read address queue onto which the interface controller is arranged to push the outbound payload information of an address transfer of a read transaction, and a write address queue onto which the interface controller is arranged to push the outbound payload information of an address transfer of a write transaction.

In one embodiment, the plurality of queues comprise a write data queue onto which the interface controller is arranged to push the outbound payload information of a data transfer of a write transaction, and a read data queue from which the interface controller is arranged to pop the inbound payload information of a data transfer of a read transaction.

Further, in one particular embodiment, the plurality of queues further comprise a write response queue from which the interface controller is arranged to pop the inbound payload information of a write response transfer of a write transaction, the write response transfer providing status information for the write transaction. Such status information may indicate, for example, whether the transaction completed successfully, or whether an error occurred, etc.

Whilst in one embodiment the processing of the payload information is performed in a functional unit separate to the interconnect interface unit, in one embodiment the interconnect interface unit further comprises additional circuitry in the form of payload information processing circuitry for performing one or more predetermined payload information processing operations when processing of one or more types of transaction. By such an approach, the handling of certain types of interconnect operations can be accelerated in hardware (when compared with a form of interconnect interface unit not having such additional circuitry) in order to reduce execution time, whilst other operations are allowed to take longer execution times and can be handled for example by the earlier described separate functional unit(s).

The predetermined payload information processing operations that the payload information processing circuitry within the interconnect interface unit can perform can take a variety of forms. In one embodiment, for said one or more types of transaction, the payload information processing circuitry is arranged to provide one or more items of control information to be included within said outbound payload information. In one embodiment, at least one of the items of control information comprises a constant value. Alternatively, the interface controller is arranged to determine at least one of said one or more items of control information from the command issued by the main controller. In such embodiments, the payload information processing circuitry can be used to merge that determined control information into the outbound payload information.

Such techniques for determining the control information using hardware within the interconnect interface unit can provide significant performance improvements when compared with the alternative approach of determining that control information through the execution of one or more instructions by the main controller, and can be achieved through a relatively small increase in the amount of hardware, particularly when constrained to operate on only a subset of the possible transactions.

In an alternative embodiment, or in addition, for one or more types of transactions, the payload information processing circuitry is arranged to determine with reference to at least one of said outbound or inbound payload information whether an exception condition exists. Again, through use of appropriate hardware to detect exception conditions, this can give rise to significant performance benefits when compared to the use of a sequence of software instructions to analyse payload information in order to detect occurrence of exception conditions.

In one embodiment, if on receipt of one of said commands from the main controller, said interface controller determines, having regard to the queue to which that command relates, that the command cannot currently be processed, the interface controller is arranged to assert a stall request signal to cause the main controller to stall execution of a subsequent instruction. As examples of situations where the command cannot currently be processed, if the command relates to a send queue and the send queue is currently full, then it will not be possible to push a further item of outbound payload information on to the send queue. Similarly, for a receive queue, if the receive queue is empty it will not be possible to pop any valid inbound payload information from the receive queue. Under these conditions, the stall request causes the main controller to stall execution of a subsequent instruction, so that that subsequent instruction is not executed until the current command has been processed.

In one embodiment, the interface controller is responsive to receipt of an asserted stall signal to ignore the command received from the main controller during the time that the stall signal is asserted. The stall signal may be asserted by a number of components within the data processing apparatus, and will typically cause multiple of the components within the data processing apparatus, including the main controller, to stall execution. However, whilst stalled, the main controller will still be asserting a command output immediately prior to entering the stall state, and by asserting the stall signal separately to the interface controller, this ensures that the interface controller does not action that command whilst the stall signal is asserted.

In one embodiment, the interface controller is responsive to receipt of an asserted abort signal to complete any non-complete transactions in a predetermined manner without reference to any further command received from the main controller. The abort signal can be issued from a variety of sources, but in one embodiment the source of the abort signal will be external to the data processing apparatus, and hence for example may be issued by another device within the data processing system incorporating the data processing apparatus. Typically, all of the key components within the data processing apparatus including the main controller, the interface controller and any functional units, will process the abort signal. In the presence of an abort signal, it will typically be necessary for certain steps to be taken in respect of any non-complete transactions so that they are placed in a deterministic state, and hence the interface controller is provided with a mechanism to complete such transactions in a predetermined manner. Hence, by way of example, when the abort signal is asserted, the interface controller ignores any command from the main controller and takes steps to finish any non-complete transactions. Purely by way of illustration, if a write transaction with a burst length of six is issued, and the abort signal is asserted after two write data transfers have been issued, the interface controller can be arranged to ensure that the remaining four write data transfers are issued, albeit with dummy data, and also ensures that any write response associated with the transaction is accepted into the relevant receive queue.

In one embodiment, when the non-complete transactions are completed, the interconnect interface unit is arranged to issue an abort done signal to a source of the asserted abort signal. This hence identifies to the source of the asserted abort signal that the abort process has been handled in a safe manner.

In one embodiment, the interface controller is responsive to a data memory barrier signal being asserted in response to a synchronisation instruction being executed by the main controller, to assert a stall request signal until all outstanding transactions have completed. Hence, in such embodiments, when the main controller executes a synchronisation instruction, a data memory barrier signal is issued to the interface controller which causes it to assert a stall request signal. This prevents the main controller from executing the next instruction until the stall request signal is de-asserted, which only occurs once all outstanding transactions have completed. This provides an effective mechanism to ensure that the next instruction is not executed by the main controller until all outstanding transactions have completed.

The plurality of queues within the interconnect interface unit can take a variety of forms, but in one embodiment each of the queues are FIFO (First-In-First-Out) storage structures.

In one embodiment, the number of entries in each FIFO is chosen having regard to a number of pending transactions to be handled by the interconnect interface unit.

The interconnect protocol can take a variety of forms, but in one embodiment the interconnect protocol is a multi-channel protocol providing multiple channels of communication, and each queue is arranged to interface with at least one channel. Hence, in one embodiment, a separate queue can be provided for each channel, or alternatively one queue can be used for multiple channels. As a particular example, a single address queue can be used for both the read address channel and the write address channel.

In one embodiment, within each channel the outbound or inbound payload information is transferred in accordance with a pair of handshake signals, and the interconnect port provides a handshaking component for each of said plurality of queues for generating one of said handshake signals.

One example of a multi-channel protocol that may be used is the AXI (Advanced eXtensible Interface) protocol developed by ARM Limited, Cambridge, United Kingdom, which provides five separate channels of communication, namely a write address channel, a write data channel, a read address channel, a read data channel, and a write response channel.

Viewed from a second aspect, the present invention provides a method of connecting a data processing apparatus to interconnect circuitry to enable the data processing apparatus to act as a master device to initiate transactions conforming to an interconnect protocol associated with the interconnect circuitry, comprising the steps of: executing within a main controller of the data processing apparatus a programmable sequence of instructions including a transaction sequence of instructions used to process a transaction to be initiated by the data processing apparatus, the transaction sequence of instructions being programmed dependent on the interconnect protocol; providing within an interconnect interface unit of the data processing apparatus a plurality of queues including at least one send queue for issuing outbound payload information to the interconnect circuitry and at least one receive queue for receiving inbound payload information from the interconnect circuitry; pushing the outbound payload information onto the at least one send queue and popping the inbound payload information from the at least one receive queue under the control of commands issued by the main controller when executing said transaction sequence of instructions; and communicating with the interconnect circuitry via an interconnect port in order to output outbound payload information from the at least one send queue and receive inbound payload information for placing on the at least one receive queue.

Viewed from a third aspect, the present invention provides a data processing apparatus for connection to interconnect means, the data processing apparatus for acting as a master means for initiating transactions conforming to an interconnect protocol associated with the interconnect means, comprising: main controller means for executing a programmable sequence of instructions including a transaction sequence of instructions used to process a transaction to be initiated by the data processing apparatus, the transaction sequence of instructions being programmed dependent on the interconnect protocol; and interconnect interface means comprising: a plurality of queue means including at least one send queue means for issuing outbound payload information to the interconnect means and at least one receive queue means for receiving inbound payload information from the interconnect means; interface controller means for pushing the outbound payload information onto the at least one send queue means and popping the inbound payload information from the at least one receive queue means under the control of commands issued by the main controller means when executing said transaction sequence of instructions; and interconnect port means for communicating with the interconnect means in order to output outbound payload information from the at least one send queue means and receive inbound payload information for placing on the at least one receive queue means.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
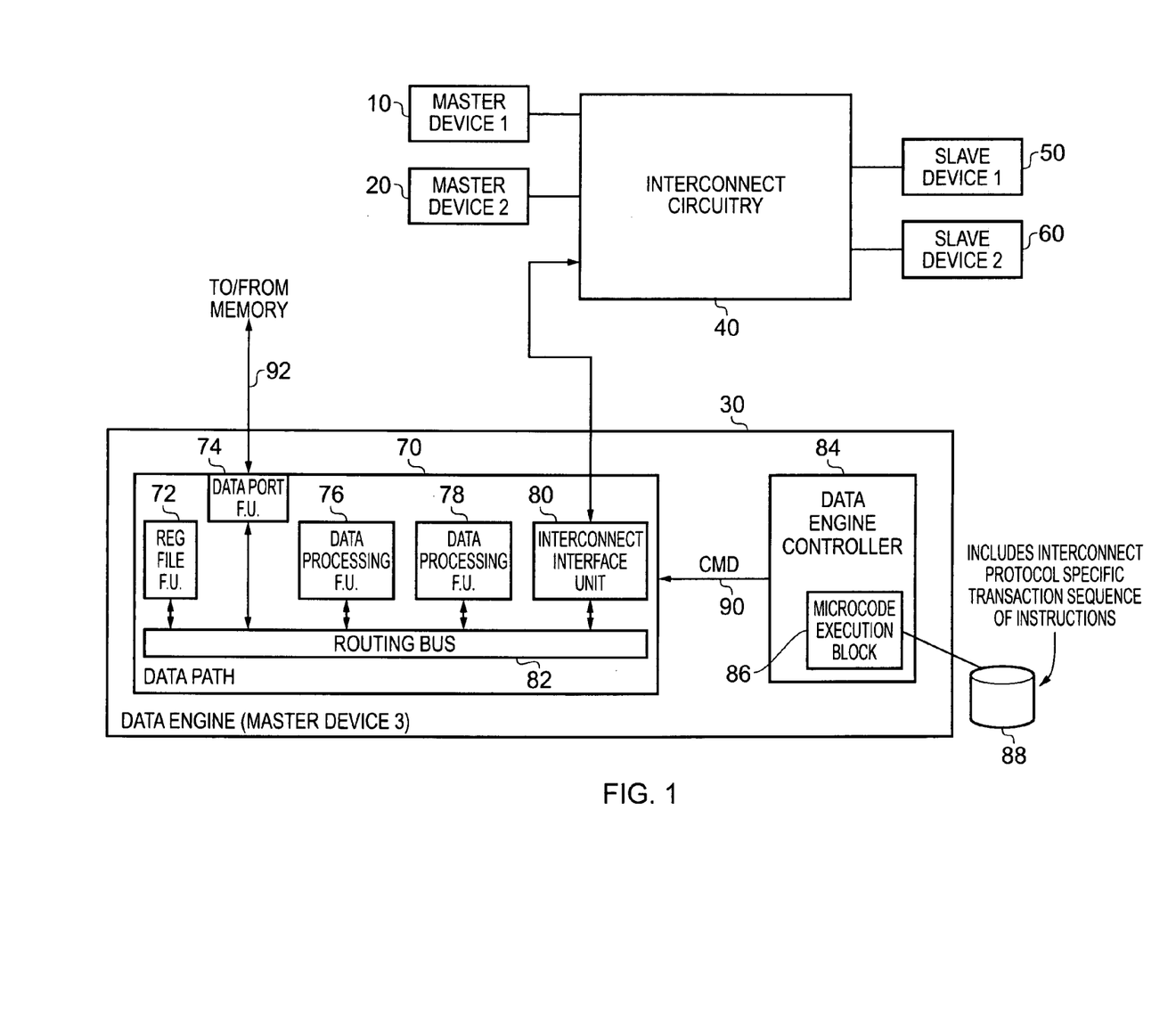
FIG. 1 is a block diagram illustrating a data processing apparatus in accordance with one embodiment of the present invention connected to interconnect circuitry.

FIG. 1 is a block diagram illustrating a data processing apparatus in accordance with one embodiment of the present invention, with that data processing apparatus being coupled to interconnect circuitry to operate as a master device. In particular, interconnect circuitry 40 is shown having a plurality of master devices 10, 20, 30 coupled via the interconnect circuitry 40 with a plurality of slave devices 50, 60. At least the master device 30 is formed by a data processing apparatus in accordance with an embodiment of the present invention, and in the particular embodiment shown in FIG. 1 the data processing apparatus 30 takes the form of a data engine. As shown in FIG. 1, the data engine 30 comprises a data engine controller 84 with an execution block 86 for executing a sequence of instructions stored in a memory device 88 (which may be provided internally within the data engine or externally). In the embodiment shown, the instructions take the form of microcode. Within the sequence of microcode instructions will be at least one transaction sequence of instructions, each transaction sequence of instructions, when executed, causing the data engine to process a corresponding transaction.

As the data engine controller 84 executes each instruction, it will send a corresponding command over path 90 to one or more of the components within the data path section 70. As shown in FIG. 1, the data path section 70 may incorporate a variety of components, referred to herein as functional units, interconnected via a routing bus 82. Hence one or more data processing functional units 76, 78 may be provided, for example for performing arithmetic operations on data. The data may be stored within the register file functional unit 72 or may be retrieved via the data port functional unit 74 over path 92 from an external memory device. That external memory device may in fact be constituted by one of the slave devices 50, 60 coupled to the interconnect circuitry 40, or may be constituted by an entirely separate memory device.

In addition, in accordance with embodiments of the present invention, the data path 70 also includes an interconnect interface unit 80 which, under the control of appropriate commands from the data engine controller 84, can act as a master device with respect to the interconnect circuitry 40. In one embodiment, the interconnect interface unit 80 can be viewed as a physical implementation that cooperates with, or can be managed by, a system-call functional unit (SCFU) as described in more detail in co-pending, commonly owned, U.S. patent application Ser. No. 11/403,201, the entire contents of which are hereby incorporated by reference. The interconnect interface unit 80 allows the data engine 30 to act as a master device to control transactions passing between the data engine and the external environment such as the interconnect circuitry 40.

Figure 2:
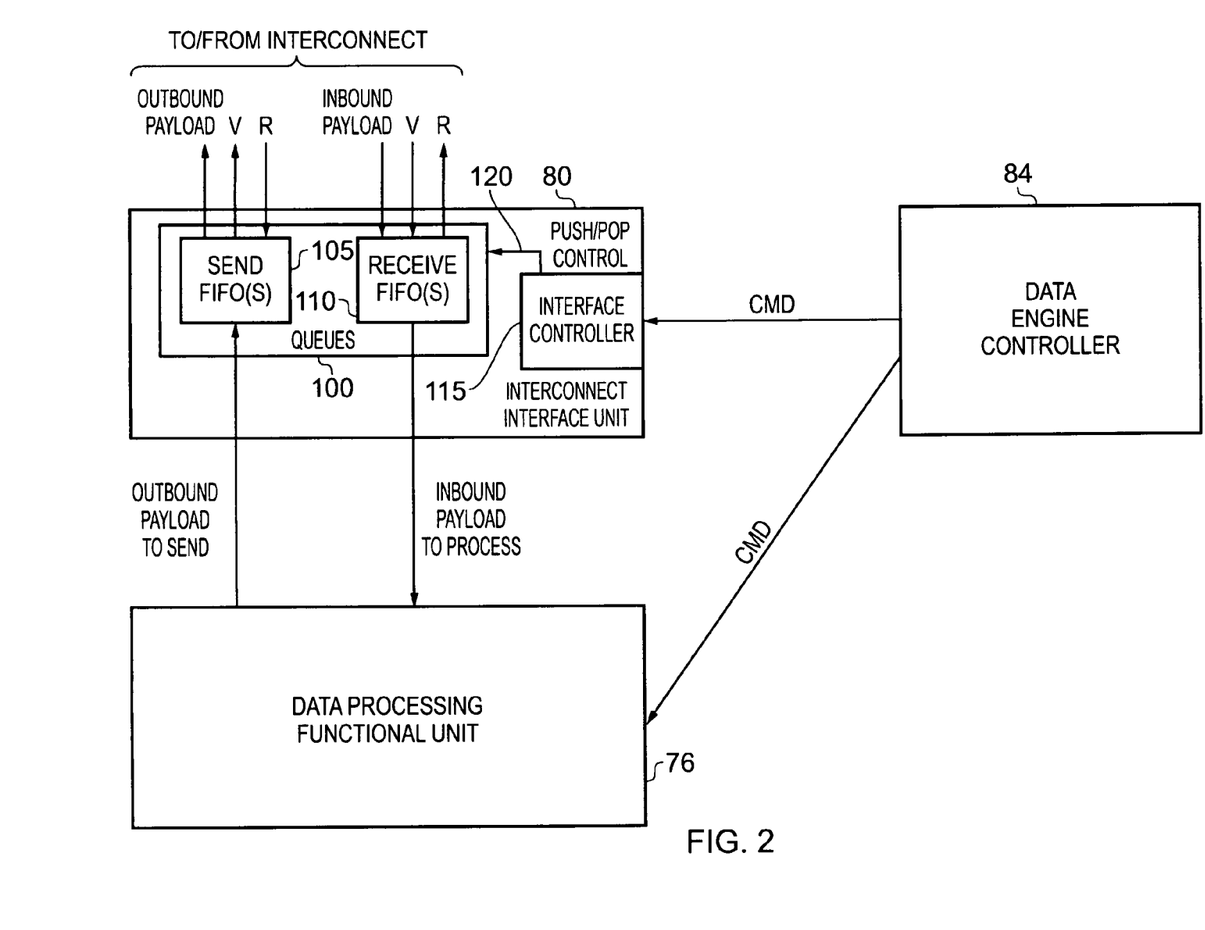
FIG. 2 is a block diagram schematically illustrating the operation of certain components within the data processing apparatus of FIG. 1 in accordance with one embodiment.

FIG. 2 is a diagram illustrating in more detail the operation of the interconnect interface unit 80 of FIG. 1 in accordance with one embodiment. As shown in FIG. 2, a plurality of queues 100 are provided within the interconnect interface unit 80, including one or more send queues 105 and one or more receive queues 110. In the embodiment shown, each queue is formed as a FIFO (First-In-First-Out) storage structure. The interconnect interface unit 80 also incorporates an interface controller 115 which is responsive to commands issued by the data engine controller 84 when executing a transaction sequence of instructions to issue various push and pop control signals over path 120 to the queues 100. In particular, as mentioned earlier, each transaction will typically comprise an address transfer issued from a master device to a slave device followed by one or more data transfers in either direction between the master device and the slave device, with the direction of the data transfers being dependent on the type of transaction. For a write transaction, the write data transfers will pass from the master device to the slave device, and in one embodiment a write response data transfer will be passed from the slave device to the master device providing transaction status information, for example to identify whether the transaction completed successfully, or whether an error occurred, etc. For a read data transfer, the data transfers will pass from the slave device to the master device. For the purposes of the following discussion, any transfer from the master device to the slave device will be considered to comprise outbound payload, and any transfer from the slave device back to the master device will be considered to comprise inbound payload.

Accordingly, when a transaction is initiated by execution of a first instruction within the transaction sequence by the data engine controller 84, this will typically cause a command to be sent to the interface controller 115 to cause a push command to be sent to the relevant send FIFO 105 to cause corresponding outbound payload to be pushed on to that FIFO, typically this outbound payload comprising the address to be transferred at the start of the transaction. Thereafter, one or more further commands will typically be received by the interface controller 115 as further instructions of the transaction sequence are executed by the data engine controller 84 to cause one or more push or pop control signals to be sent to the relevant send or receive FIFOs to cause further outbound payload to be pushed on to a send FIFO 105 and/or any inbound payload to be popped from the relevant receive FIFO 110.

Typically the interconnect circuitry 40 will employ handshake signals to control the propagation of payload information through the interconnect circuitry, and in the example of FIG. 2 this handshaking is performed by valid and ready signals. In particular, the handshake signals take the form of a valid signal passing in the same direction as associated payload data, and a ready signal passing in an opposite direction to the payload data and the valid signal. The valid signal will be asserted when there is valid payload to be sent from the initiator, whilst a ready signal will be asserted by a recipient when it is able to receive payload. Accordingly, each send FIFO 105 will be arranged to assert a valid signal when it has an item of outbound payload to transmit, the valid signal being output in parallel with that item of outbound payload. When an asserted ready signal is received by that send FIFO 105, it can be assumed that the outbound payload has been received by the recipient, and accordingly that item of payload can be removed from the send FIFO 105. Similarly, a receive FIFO 110 will assert a ready signal when it has space to receive a new item of inbound payload and, in a clock cycle where it has asserted the ready signal, will then store any valid inbound payload received from the interconnect along with an asserted valid signal.

From the above description, it will be appreciated that the output of outbound payload information from a send FIFO to the interconnect, and the reception of inbound payload information by a receive FIFO from the interconnect, occur entirely in dependence on the valid and ready handshake signals issued over the path between the interconnect interface unit 80 and the interconnect circuitry 40. However, the pushing of outbound payload into a send FIFO, and the popping of inbound payload from the receive FIFO, take place under the control of the interface controller 115, and as discussed earlier those operations are performed in response to command signals received from the data engine controller 84 when the data engine controller executes corresponding instructions within a transaction sequence of instructions. Hence, the interface between the queues 100 and the interconnect circuit 40 operates asynchronously to the pushing and popping operations instigated by the interface controller 115.

The outbound payload to be sent via a send FIFO can be generated in a variety of ways, but in one embodiment, as shown in FIG. 2, a data processing functional unit such as the data processing functional unit 76 may be used to generate that outbound payload under the control of a command issued by the data engine controller 84 when executing a corresponding instruction in the sequence of microcode instructions executed by the data engine controller. Similarly, inbound payload popped from the receive FIFO can be passed to such a data processing functional unit 76 for subsequent processing, with that subsequent processing again being performed in dependence on a command received from the data engine controller 84 when executing the relevant instruction in the sequence of microcode instructions.

The arrangement shown in FIG. 2 keeps the complexity and size of the interconnect interface unit 80 to a minimum, by avoiding the need for the interconnect interface unit 80 to perform any processing of the outbound payload or inbound payload. However, as will be discussed later with reference to FIG. 7, in one embodiment, certain hardware can be added to the interconnect interface unit 80 to enable predetermined payload processing operations to be performed directly within the interconnect interface unit 80. Such an approach can save processing time and program size by avoiding the need to use the functional unit 76 to perform the processing operations under the control of instructions executed by the data engine controller 84, at the expense of increasing the cost and complexity of the interconnect interface unit 80.

Figure 3:
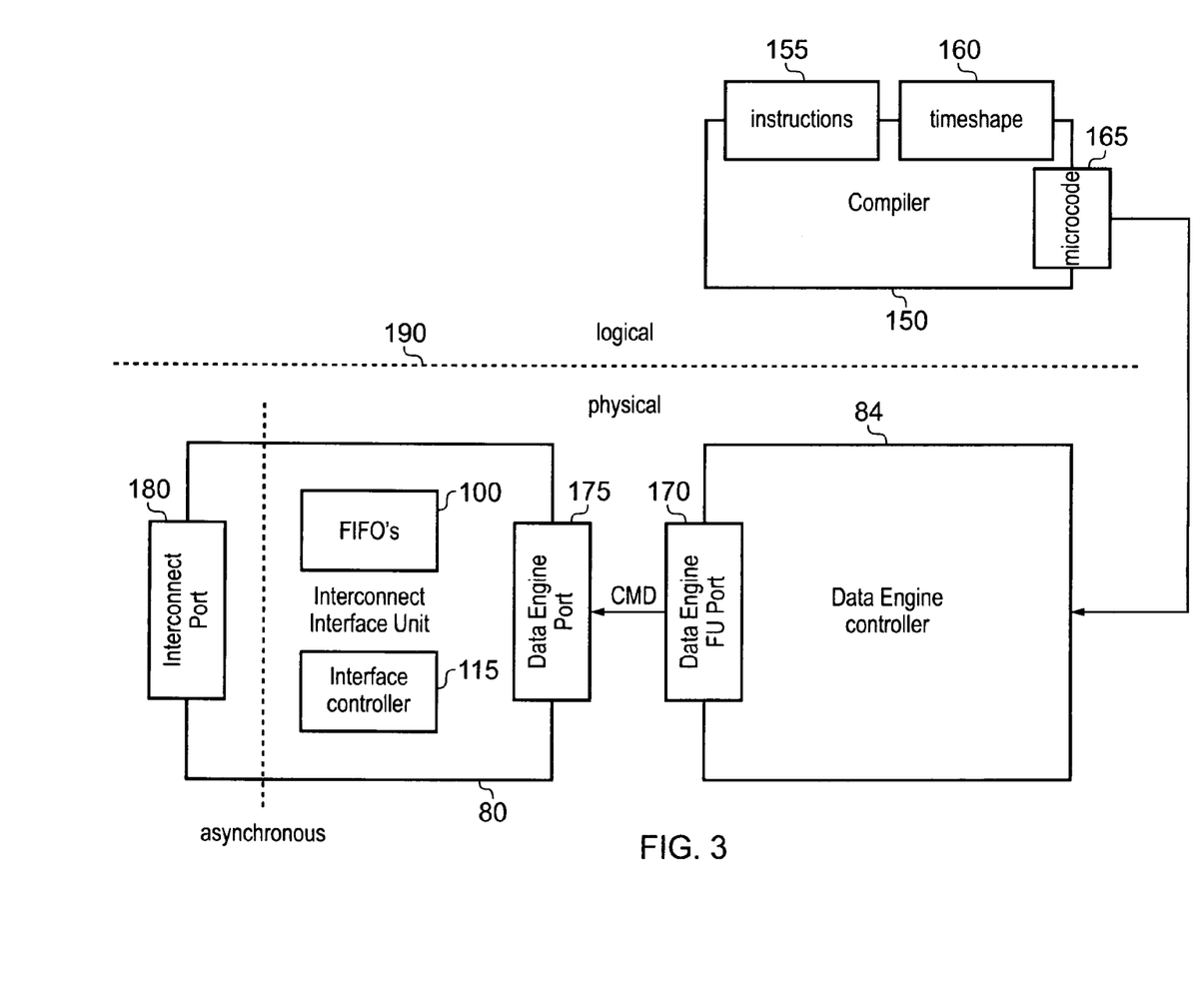
FIG. 3 is a block diagram schematically illustrating in more detail the operation of the data engine controller and interconnect interface unit of FIG. 2, when operating under the control of microcode instructions generated by a compiler for execution on the data engine controller.

FIG. 3 is a block diagram schematically illustrating in more detail the operation of the data engine controller 84 and interconnect interface unit 80 of FIG. 2 when operating under the control of microcode instructions generated by a compiler 150. In particular, as shown, a compiler 150 is arranged to be responsive to user defined instructions 155 to generate a sequence of microcode 165 for executing on the data engine controller 84. When performing that compilation process, the compiler 150 has regards to time shape information 160 identifying one or more timing properties of the interconnect circuitry 40 having regard to the interconnect protocol used by that interconnect circuitry. Such time shape information will be discussed in more detail later with reference to FIGS. 5 and 6, and enables the compiler to take into account the timing of certain events within the interconnect circuitry, thereby enabling the compiler to optimize the microcode sequence accordingly.

When a transaction sequence of microcode instructions is executed by the data engine controller, then the data engine controller will issue a number of commands from its data engine functional unit port 170 to a corresponding data engine port 175 provided at the interconnect interface unit 80. Typically, these commands will be routed to the interface controller 115 to cause the required push and/or pop operations to be performed in respect of the FIFOs 100.

Whereas in FIG. 2 the send and receive FIFOs were illustrated schematically as communicating directly with the interconnect, in the embodiments shown in FIG. 3 such communication is actually effected by the interconnect port 180. In particular, the interconnect port 180 provides a handshaking component for each FIFO to control the transmission of outbound payload from each send FIFO 105, and the reception into each receive FIFO of the relevant inbound payload from the interconnect. As indicated by the vertical dotted line in FIG. 3, the interconnect port 180 operates asynchronously to the other operations performed within the interconnect interface unit and the data engine controller, in particular the interconnect port 180 operating asynchronously to the execution of the sequence of microcode instructions by the data engine controller 84. The operation of the interconnect port 180 is hence dictated solely by the interconnect protocol. Whilst at least one send FIFO has outbound payload to send, the interconnect port 180 will seek to output that outbound payload to the interconnect circuitry when allowed having regards to the handshake signals, and similarly will, dependent on the handshake signals, route valid inbound payload to the relevant receive FIFO. In this latter case, the interconnect port 180 will only assert a ready signal for the relevant receive FIFO when that receive FIFO is capable of receiving inbound payload.

The horizontal dotted line 190 in FIG. 3 is intended to illustrate the separation between the physical components of the data engine below the dotted line, and the logical components above the dotted line which are used to generate the microcode executed by the data engine controller 84.

Figure 4:
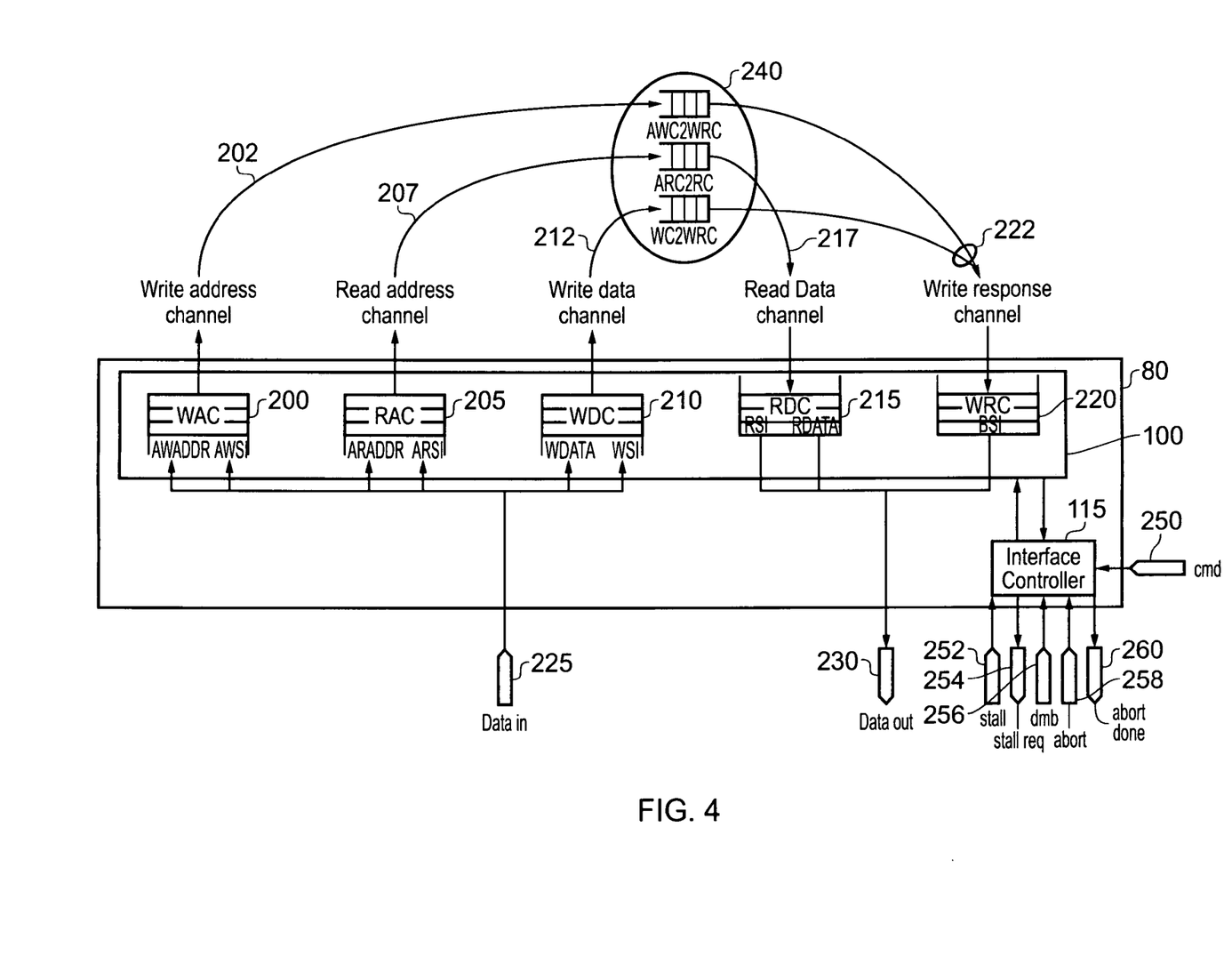
FIG. 4 is a diagram illustrating in more detail the components provided within the interconnect interface unit of FIG. 1 in accordance with one embodiment.

FIG. 4 is a diagram schematically illustrating the queues provided within the interconnect interface unit 80 in accordance with one embodiment. In this embodiment, it is assumed that the interconnect circuitry 40 operates in accordance with the AXI interconnect protocol developed by ARM Limited, Cambridge, United Kingdom. The AXI protocol provides a number of channels over which payload information is transferred when a transaction is performed from a master device to a slave device. In particular, a write address (AW) channel 202 is provided for carrying address transfers of write transactions, a write data (W) channel 212 is provided for carrying data transfers of write transactions, a write response (B) channel 222 is provided for returning transaction status information to the master at the end of a write transaction, a read address (AR) channel 207 is provided for carrying address transfers of read transactions, and a read data (R) channel 217 is provided for carrying data transfers of read transactions.

In the example of FIG. 4, the plurality of queues 100 include a separate queue for each of these five channels, namely a write address (WAC) queue 200, a read address (RAC) queue 205, a write data (WDC) queue 210, a read data (RDC) queue 215, and a write response (WRC) queue 220. Outbound payload can be routed via the input 225 to the relevant send queue 200, 205, 210, whilst inbound payload can be popped from the relevant receive queue 215, 220 and output over the output path 230. The interface controller 115 controls the pushing of payload on to the send queues and the popping of payload from the receive queues as discussed earlier, in response to commands received at the input 250 from the data engine controller 84.

The payload information can take a variety of forms. For example, for a write address transfer, the payload information includes a write address (AWADDR) along with associated control signals (referred to in FIG. 4 as AWSI signals where SI stands for "side information"). As will be appreciated by those skilled in the art, these control signals will take a variety of forms dependent on the interconnect protocol being used, but by way of example may specify length, size, burst attributes, etc, associated with the transaction, may identify whether the data the subject of the transaction is cacheable, etc. For a read address transfer, the payload information takes a very similar form to that for a write address transfer. For write data and read data transfers, the payload information typically comprises an item of data and associated control signals (side information), although typically the side information is reduced when compared with the side information associated with an address transfer. For the write response transfer, the payload information is formed solely of side information providing the transaction status information at the end of a write transaction.

The various queuing elements shown within the circle 240 of FIG. 4 schematically represent the timing delay that will typically occur within the interconnect between the initiation of a write transaction and the subsequent write response for that transaction, or between the output of the read address for a read transaction, and the subsequent receipt of the read data.

As also shown in FIG. 4, the interface controller 115 can receive various other signals via the inputs 252, 256, 258, and may issue various signals via the outputs 254, 260. Accordingly, if on receipt of a command from the data engine controller 84, the interface controller 115 determines, having regard to the queue to which that command relates, that the command cannot currently be processed, the interface controller is arranged to assert a stall request signal via the output 254 to cause the data engine controller 84 to stall execution of a subsequent instruction. Such a condition can arise, for example, if a send queue is already full at the time a push command is received, or if a receive queue is empty at the time a pop command is received.

In addition to being able to issue stall requests, the interface controller 115 also responds to asserted stall signals input via the input path 252. In particular, if an asserted stall signal is received over path 252, the interface controller 115 is arranged to ignore the command being received via the input 250 from the data engine controller 84 whilst that stall signal is asserted. This ensures that the interconnect interface unit 80 is placed in the stall state whilst the stall signal is asserted.

As also shown in FIG. 4, the interface controller 115 may receive an asserted abort signal over input 258, typically such an abort signal being asserted by a component external to the data engine 30. In the presence of such an asserted abort signal, the interface controller 115 is arranged to complete any non-complete transactions in a predetermined manner without reference to any further command received from the data engine controller 84 via the path 250. Hence, by way of example, the interface controller will perform any remaining data transfers, albeit with dummy data, in order to ensure that all of the expected transfers associated with each of the pending transactions has been completed, thereby ensuring that the system is placed in a safe state.

When all of the non-completed transactions have been completed, the interface controller 115 will then issue an abort-done signal over path 260, which will be returned to the source of the asserted abort signal to confirm that the required actions have been taken in response to the asserted abort signal.

As also shown in FIG. 4, the interface controller 115 can receive a data memory barrier (dmb) signal asserted over path 256, this signal being asserted in response to a synchronisation instruction executed by the data engine controller 84. On receipt of such an asserted data memory barrier signal, the interface controller 115 is arranged to assert a stall request signal over path 254 until all outstanding transactions have completed. As discussed earlier, the presence of a stall request signal will then cause the data engine controller 84 to stall execution of the subsequent instruction. Hence, this process enables a synchronisation instruction to be executed by the data engine controller 84, and for the next instruction not to be executed until all pending transactions have been completed.

The transaction sequence of instructions executed by the data engine controller in order to process a transaction can take a variety of forms. However, in one embodiment, each instruction in the transaction sequence corresponds to a particular transfer within the transaction, and results in a command being sent to the interface controller to cause a push or a pop operation to be performed in respect of a particular one of the queues. Further, the timing between the execution of the individual instructions in the transaction sequence is chosen having regard to properties of the interconnect circuitry, and in particular properties of the interconnect protocol used by the interconnect circuitry. In particular, in one embodiment, the sequence of instructions are compiled such that the individual instructions of the transaction sequence are executed at times which produce the relative timing between the commands issued to the interface controller, taking into account known timing constraints within the interconnect. For example, it may be known that the earliest that a write response transfer will take place after the last write data transfer is ten clock cycles after that last write data transfer, and the compiler can take that fact into account when determining a point in time at which to execute an instruction to cause the interface controller 115 to seek to pop a write response inbound payload from the write response queue 220.

In one embodiment, all transactions are hence modelled as a single time shape representation, as will be discussed in more detail with reference to the examples of FIGS. 5 and 6. The following Table 1 identifies the meaning of the various symbols used in FIGS. 5 and 6:

TABLE 1

| | |
|---|---|
| ▽ | Time shape data input |
| △ | Time shape data output |
| (foo) | Interconnect protocol operation |
| ----- | Data engine execution cycle boundary |
| ===== | One or more data engine execution cycles boundaries |
| cmd (<x>) | Command instruction applied in data engine execution cycle |
| C (<y>) | Data engine execution cycle. |

Figure 5:
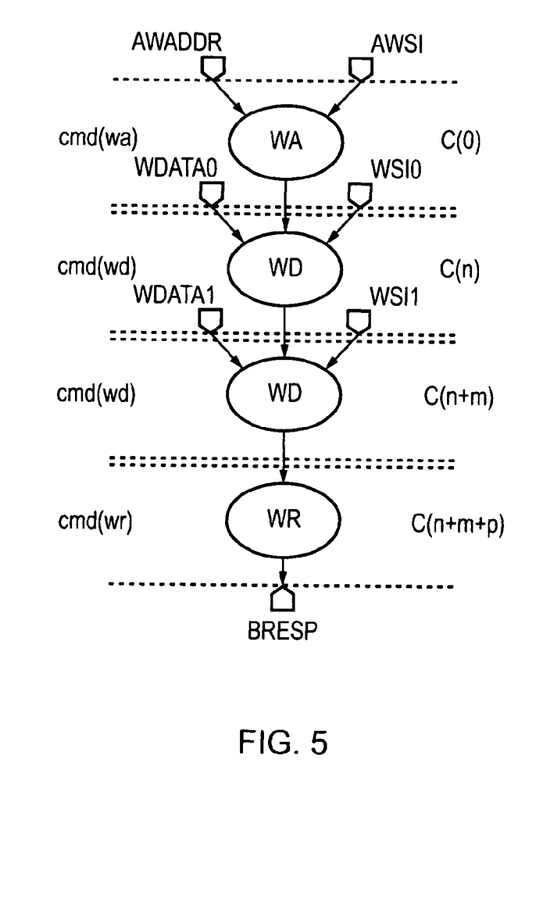
FIG. 5 illustrates a time shape model of a write transaction that may be used when compiling a transaction sequence of instructions to be executed by the data engine controller of FIG. 1 in order to implement a write transaction.

FIG. 5 shows the time shape form for a write burst transaction with software defined write address and write data side information, and which returns a write response. As shown, at the start of execution cycle 0, a write address and associated write address side information is input and a write address command instruction is executed to cause the interface controller 115 to push the write address and write address side information on to the write address queue 200, thereby implementing the write address transfer of the write transaction. Once that write address payload has been added to the write address queue, it will be output from the write address queue over the write address channel 202 when it reaches the head of the queue (in the first clock cycle where an asserted ready signal is received over the write address channel).

One or more data engine execution cycles later, the exact timing being dependent on the way in which the individual instructions of the transaction sequence are compiled, a write data command instruction will be executed to cause input write data and write side information to be stored as payload information within the write data queue 210 (by causing the interface controller 115 to issue a push command to that write data queue 210).

Similarly, one or more data engine execution cycles later, a further data transfer can take place. In the example shown in FIG. 5, it is assumed that two data transfers take place within the write transaction, but it will be appreciated that the process can be repeated as necessary for various different burst lengths of write transaction. Finally, one or more data engine execution cycles later, a write response command instruction is executed to cause a command to be sent to the interface controller 115, to cause the interface controller to pop a write response from the write response queue 220, this write response taking the form of the BRESP signal shown at the bottom of FIG. 5.

It will be appreciated that a wide variety of different write transactions can be modelled in a similar manner using the basic approach shown in FIG. 5.

Figure 6:
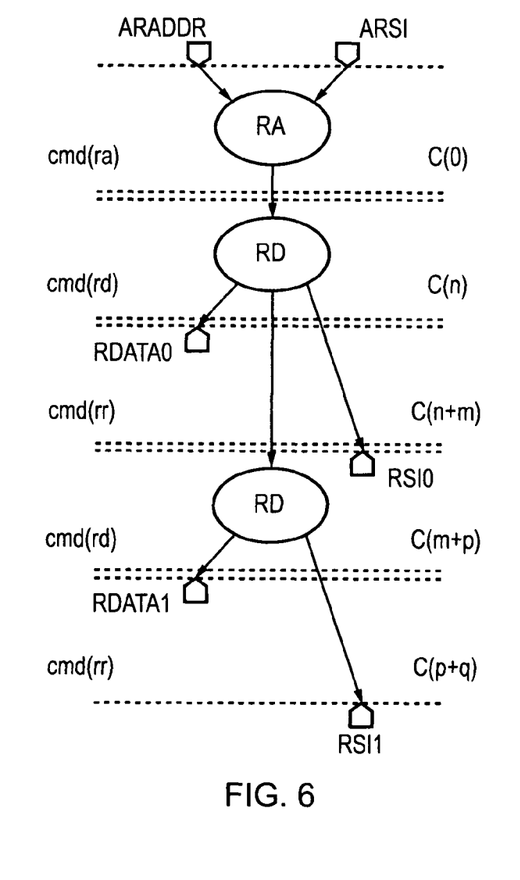
FIG. 6 illustrates a time shape model of a read transaction that may be used when compiling a transaction sequence of instructions to be executed by the data engine controller of FIG. 1 in order to implement a read transaction.

FIG. 6 shows a similar diagram for a read burst with software defined read address side information, returning the read response. In a first cycle, a read address command instruction is executed to cause a command to be issued to the interface controller 115 to cause it to push the provided read address and read address side information on to the read address queue 205, thereby implementing the read address transfer of the transaction. One or more data engine execution cycles later, a read data command instruction is executed to cause a command to be sent to the interface controller 115 to seek to pop read data from the read data queue 215.

One or more data engine execution cycles later, the data engine controller 84 is arranged to execute a return read side information instruction (called a cmd(rr) instruction in FIG. 6) to return the read side information of the last read data transfer by popping that information from the read data queue 215. The use of this command is actually specific to the embodiment to be described later with reference to FIG. 7, where the read response is stored in a separate RSI register associated with the read data queue 215, with that RSI register's content then being popped in response to the rr command. This will be discussed in more detail later with reference to FIG. 7.

The same sequence is then repeated for each subsequent read data transfer of the read burst transaction, in FIG. 6 it being assumed that there are two read transfers in the read transaction.

It will be appreciated from the above description of FIGS. 5 and 6 that the actual timing at which the various individual instructions of a transaction sequence are executed can be varied having regard to known timing properties of the interconnect circuitry with which the data engine is to be coupled, and the interconnect protocol used by that interconnect circuitry. These factors can be taken into account by the compiler when compiling the sequence of instructions for execution by the data engine controller. Hence, the values of n, m, p and q in the above described FIGS. 5 and 6 can be varied as appropriate. Indeed, in one particular embodiment, the values n, m, p and q may all be set to one, so that the various commands shown in FIG. 5 or 6 are executed one after the other in adjacent data engine execution cycles.

Figure 7:
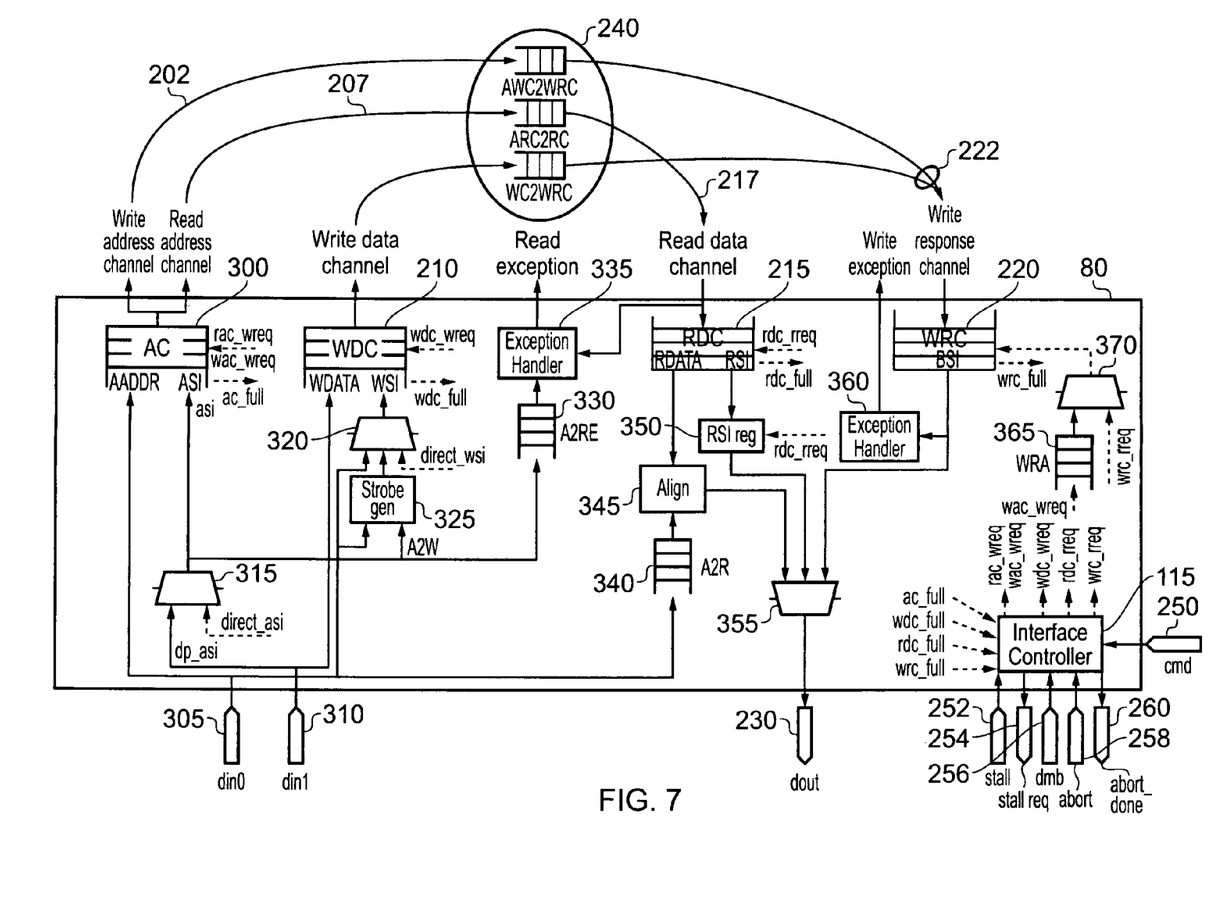
FIG. 7 is a diagram illustrating an alternative embodiment of the interconnect interface unit of FIG. 1 where frequently used operations are accelerated through the use of additional hardware incorporated within the interconnect interface unit of FIG. 1.

FIG. 7 is a diagram illustrating an alternative embodiment of the interconnect interface unit 80 of FIG. 1, where additional hardware elements are included to accelerate frequently encountered interconnect operations. In FIG. 7, those elements that are the same as in the earlier-described FIG. 4 are identified with the same reference numerals. In the example of FIG. 7, the two address queues 200, 205 of the FIG. 4 embodiment are merged into a single address queue 300. The interconnect interface unit 80 of FIG. 7 operates in much the same way as described earlier for the embodiment of FIG. 4, except that for certain transfers additional hardware is used to accelerate the processing of those transfers. Those transfers are discussed in more detail below.

Single Write Transfer

To support a single write transfer with the data engine interface as illustrated in FIG. 7, the Write Address Side Information (WASI) (namely WEXEN, AWLEN, AWSIZE, AWBURST, AWLOCK, AWCACHE and AWPROT) is decoded from the command instruction (cmd) and transferred to the Write Address Channel FIFO 300 via the direct_asi signal, which is routed to the ASI input of the FIFO 300 via the multiplexer 315.

The Write Data Side Information (WSI) WLAST is decoded from the command instruction (cmd) and transferred to the Write Data Channel FIFO 210 via the direct_wsi signal, which is routed to the WSI input of the FIFO 210 via the multiplexer 320. The strobe side information WSTRB is calculated based on the AWADDR and AWSIZE values by the strobe generation block 325 and appended to direct_wsi signal.

As shown in FIG. 7, each queue will assert a full signal back to the interface controller 115 when it is full. Write Address and Write Data transfers are issued at the same time when both send FIFO queues 300, 210 are not full. If one of the FIFO queues is full, the interface controller 115 asserts a stall request signal over path 254 to cause the data engine controller to stall until both queues are not full.

At the same time, an internal command (wac_wreq) is pushed on the Write Response Accept (WRA) queue 365, which is then routed via the multiplexer 370 to the Write Response Channel receive FIFO queue 200 to accept and read the write response from that queue, that write response then being output via the multiplexer 355 for processing in the engine's data path, as discussed earlier. However, if the Write Exception Enable signal WEXEN is '1', the write response is processed by the Write Exception Handler 360 and no interaction with the engine's data path is required.

Single Read Transfer

To support a single read transfer with the data engine interface as illustrated in FIG. 7, the Read Address Side Information (RASI) (namely REXEN, ARLEN, ARSIZE, ARBURST, ARLOCK, ARCACHE and ARPROT) is decoded from the command instruction (cmd).

A first command instruction is issued from the data engine controller to write the read address and side information to the Read Address Channel send FIFO queue 300 via the inputs 305, 310. If the FIFO queue 300 is full, the data engine controller is stalled. At the same time, the ARLOCK value is pushed on a queue (A2RE) 330 towards the Read Exception Handler 335 and the ARADDR value is pushed on a queue (A2R) 340 towards the Align block 345.

A second command instruction is issued from the data engine controller to read the data and read response from the Read Data Channel receive FIFO queue 215. If this data is not yet received at this point in time, the data engine controller is stalled. Once received, the read data is LSB aligned based on the Read Address in the Align block 340 and returned to the data path via the multiplexer 355 and the output 230. The Read Response is stored in the RSI reg register 350 that can be read-out with a separate command (the rdc_rreq command). Further, if the Read Exception Enable signal REXEN is '1', the read response is forwarded to the Read Exception Handler 335.

It should be noted that the design itself does not make any assumptions on the pipeline delay between the address issue phase and the data receive phase. However, to reduce stalls, the time between the two command issues should match the pipeline delay in the AXI interconnect. This can be achieved by using the appropriate time shape definition when compiling the microcode to be executed by the data engine controller, as discussed earlier with reference to FIGS. 5 and 6.

Write Response Handler

When issuing a write transfer it is possible to indicate that the Write Response should not be returned to the engine's data path. However, because every Write Response must be accepted from the Write Response Channel, an internal command is pushed on the Write Response Accept queue (WRA) 365 to read the Write Response from the Write Response Channel receive FIFO queue 220 when it arrives. If the WEXEN value is '1', the response is processed by the Write Exception Handler 360.

Read Exception Handler

If the REXEN value is '1', the read exception handler 335 asserts an exception towards the subsystem when:

RRESP is not OKAY for a non-exclusive transfer;

Or RRESP is not EXOKAY and an exclusive read transfer was issued. This information is read from ARLOCK queue 330.

Write Exception Handler

If the WEXEN value is '1', the Write Exception Handler 360 asserts an exception towards the subsystem when BRESP does not have the value OKAY. Responses for exclusive accesses must be handled by the data engine's data path.

The following table provides a detailed listing of all the various commands which may be issued to the interface controller 115 of FIG. 7 in accordance with one specific embodiment:

TABLE 2

| Command | Encoding | Din0 | Din1 | Dout | Description | Auto exception handling |
|---|---|---|---|---|---|---|
| nop | '0000' | — | — | — | No Operation (default) | — |
| wa | '0001' | AWADDR | WASI | — | Write Address Issue. Use cases: direct channel access | When WEXEN = '1' |
| ra | '0010' | ARADDR | RASI | — | Read Address Issue. Use cases: direct channel access | WHEN REXEN = '1' |
| wd | '0011' | WSI | WDATA | — | Write Data Issue. Use cases: direct channel access | — |
| urd | '0100' | — | — | RDATA | Return Read Data zero extended. Use cases: direct channel access | — |
| srd | '0101' | — | — | RDATA | Return Read Data sign extended. Use cases: direct channel access | — |
| wr | '0110' | — | — | BSI | Return Write Response. Use cases: direct channel access | — |
| rr | '0111' | — | — | RSI | Return Read Side Info (RSI) of last Data Read transfer. Use cases: direct channel access | — |
| ra8 | '1000' | AWADDR | — | — | Read Address Issue for 8-bit data REXEN = 1, ARLEN = 0, ARSIZE = 0, ARBURST = 0, ARLOCK = 0, ARCACHE = 0, ARPROT = 2 Use cases: 8-bit single read address issue. | Yes |
| ra16 | '1001' | AWADDR | — | — | Read Address Issue for 16-bit data REXEN = 1, ARLEN = 0, ARSIZE = 1, ARBURST = 0, ARLOCK = 0, ARCACHE = 0, ARPROT = 2 Use cases: 16-bit single read address issue. | Yes |
| ra32 | '1010' | AWADDR | — | — | Read Address Issue for 32-bit data REXEN = 1, ARLEN = 0, ARSIZE = 2, ARBURST = 0, ARLOCK = 0, ARCACHE = 0, ARPROT = 2 Use cases: 32-bit single read address issue. | Yes |
| wd32 | '1011' | — | WDATA | — | Write Data Issue for 32-bit data (bursts) WSTRB = '1111', WLAST = 0 Use cases: 32-bit write bursts. | — |
| wad8 | '1100' | AWADDR | WDATA | — | Write Address, 8-bit Data and Write Response Issue (not returned to data path) WEXEN = 1, AWLEN = 0, AWSIZE = 0, AWBURST = 0, AWLOCK = 0, AWCACHE = 0, AWPROT = 2; WSTRB = f(AWADDR, AWSIZE), WLAST = 1 Use cases: 8-bit single write transfer. | Yes |
| wad16 | '1101' | AWADDR | WDATA | — | Write Address, 16-bit Data and Write Response Issue (not returned to data path) WEXEN = 1, AWLEN = 0, AWSIZE = 1, AWBURST = 0, AWLOCK = 0, AWCACHE = 0, AWPROT = 2; WSTRB = f(AWADDR, AWSIZE), WLAST = 1 Use cases: 16-bit single write transfer. | Yes |
| wad32 | '1110' | AWADDR | WDATA | — | Write Address, 32-bit Data and Write Response Issue (not returned to data path) WEXEN = 1, AWLEN = 0, AWSIZE = 2, AWBURST = 0, AWLOCK = 0, AWCACHE = 0, AWPROT = 2; WSTRB = f(AWADDR, AWSIZE), WLAST = 1 Use cases: 32-bit single write transfer. | Yes |
| wdi32 | '1111' | — | WDATA | — | Write Data Issue for 32-bit data (bursts) and Write Response Issue (not returned to data path) WSTRB = '1111', WLAST = 1 Use cases: 32-bit write bursts. | — |

From the above description of embodiments of the present invention, it will be appreciated that the techniques of such embodiments provide the following properties. The interconnect interface unit 80 can be constructed with minimal hardware, and hence occupies a small area, whilst still supporting all interconnect protocol features. This can be enabled by a simple base design as schematically illustrated in FIG. 4. The interconnect interface unit 80 is highly flexible, and can hence be applied to different interconnect protocols through appropriate modification of the microcode to be executed by the data engine controller 84. In the embodiment described, the interconnect interface unit 80 is instantiated as a functional unit within the data path 70 of a data engine, and is controlled by a subset of the microcode executed by the data engine controller 84. The interconnect interface unit 80 then provides an interface from the data engine's data path 70 towards the interconnect circuitry 40 through multiple send and receive FIFOs. These FIFOs are managed by the interface controller 115 which receives commands through the command port 250 from the data engine controller 84, and further interfaces with the data engine's stall logic to implement wait cycles.

The commands received by the interface controller 115 over the command port are low level protocol independent commands to push information from the data path on to one of the send FIFOs or to pop information from one of the receive FIFOs and return it towards the data path.

The payload information communicated between the interconnect interface unit 80 and the remainder of the data path consists of functional data, addresses and control data. The control data is in some embodiments constants that can be determined without the need to employ any operations within the data processing functional units of the data path.

The timing and sequence of the instructions, information and hence the interconnect operations, are defined as part of the microarchitecture's compiler model, and do not influence the design's hardware. Since the timing is visible to the compiler, efficient microcode can be generated.

As shown with reference to the embodiment of FIG. 7, frequent operations can be accelerated in hardware by additional logic to reduce the execution time (e.g. load, store, bursts, . . . ), whilst non-frequent operations may be allowed to take longer execution times and be handled through the interaction of the interconnect interface unit 80 with one or more data processing functional units to process the payload information (e.g. load exclusive, store exclusive, . . . ).

Accordingly, the proposed design of embodiments of the present invention is low cost, simple, highly flexible, bus protocol independent and reusable, since the actual interconnect protocol is software defined and software controlled.

The following advantages hence result from the use of such embodiments:
1. The design is low cost in terms of hardware area, whilst still maintaining full interconnect protocol feature support.
2. The design is low cost in terms of development and verification effort.
3. There is a gradual tradeoff between interconnect operation execution time and the amount of hardware provided within the interconnect interface unit.
4. Protocol state machines (time shapes) may be defined as part of the compiler, and hence can easily be updated or patched when needed.
5. The use of such embodiments enables relatively complex interconnect interfacing functionality to be added, but at a fraction of the cost that would arise from the use of a standard embedded CPU (central processing unit) or DSP (digital signal processor).

In one particular embodiment, the data engine may be employed mainly to access the control registers of peripheral slave devices connected to the interconnect circuit. In such embodiments, there is no requirement for high data throughput and hence advanced features like out-of-order transaction completion are not essential and do not need to be supported.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:
1. A data processing apparatus for connection to interconnect circuitry, the data processing apparatus configured to act as a master device to initiate transactions conforming to an interconnect protocol associated with the interconnect circuitry, wherein each transaction comprising an address transfer issued by the master device to a slave device connected to the interconnect circuitry, and one or more data transfers between the master device and said slave device. each transfer from the master device comprising outbound payload information, and each transfer to the master device comprising inbound payload information, the interconnect protocol controlling routing of the outboard and inboard payload information through the interconnect circuitry, said apparatus comprising:
  a main controller configured to execute a programmable sequence of instructions including a transaction sequence of instructions used to process a transaction to be initiated by the data processing apparatus, the transaction sequence of instructions being programmed dependent on the interconnect protocol; and
  an interconnect interface unit comprising:
    a plurality of queues including at least one send queue configured to issue the outbound payload information to the interconnect circuitry and at least one receive queue configured to receive the inbound payload information from the interconnect circuitry,
    an interface controller configured to push the outbound payload information onto the at least one send queue and configured to pop the inbound payload information from the at least one receive queue under the control of commands issued by the main controller when executing said transaction sequence of instructions; and
    an interconnect port via which the interconnect interface unit communicates with the interconnect circuitry in order to output outbound payload information from the at least one send queue and receive inbound payload information for placing on the at least one receive queue.

2. A data processing apparatus as claimed in claim 1, wherein the interconnect port operates asynchronously to the execution of said programmable sequence of instructions by the main controller, having regard to said interconnect protocol.

3. A data processing apparatus as claimed in claim 1, wherein handshake signals are used to control the propagation of the outbound and inbound payload information through the interconnect circuitry, and the interconnect port provides a handshaking component for each of said plurality of queues for generating one of said handshake signals.

4. A data processing apparatus as claimed in claim 1, further comprising:
   at least one functional unit for performing payload information processing operations under the control of commands issued by the main controller when executing said sequence of instructions.

5. A data processing apparatus as claimed in claim 1, wherein:
   the main controller is arranged, when executing said transaction sequence of instructions, to issue the commands to the interface controller such that a relative timing between the commands is dependent on the interconnect protocol.

6. A data processing apparatus as claimed in claim 5, wherein the sequence of instructions are compiled such that the individual instructions of the transaction sequence are executed at times which produce said relative timing between the commands issued to the interface controller.

7. A data processing apparatus as claimed in claim 6, wherein said sequence of instructions comprises a sequence of microcode instructions generated by a compiler for execution by the main controller.

8. A data processing apparatus as claimed in claim 7, wherein the compiler generates the sequence of microcode instructions from a sequence of user defined instructions having regard to timeshape information identifying one or more timing properties of the interconnect circuitry having regard to the interconnect protocol.

9. A data processing apparatus as claimed in claim 1, wherein said outbound payload information for each address transfer comprises an address value and one or more items of control information, and said outbound or inbound payload information for each data transfer comprises a data value and one or more items of control information.

10. A data processing apparatus as claimed in claim 1, wherein:
   said at least one send queue comprises at least one address queue onto which the interface controller is arranged to push the outbound payload information of each address transfer.

11. A data processing apparatus as claimed in claim 10, wherein the at least one address queue comprises a read address queue onto which the interface controller is arranged to push the outbound payload information of an address transfer of a read transaction, and a write address queue onto which the interface controller is arranged to push the outbound payload information of an address transfer of a write transaction.

12. A data processing apparatus as claimed in claim 1, wherein said plurality of queues comprise a write data queue onto which the interface controller is arranged to push the outbound payload information of a data transfer of a write transaction, and a read data queue from which the interface controller is arranged to pop the inbound payload information of a data transfer of a read transaction.

13. A data processing apparatus as claimed in claim 12, wherein said plurality of queues further comprise a write response queue from which the interface controller is arranged to pop the inbound payload information of a write response transfer of a write transaction, the write response transfer providing status information for the write transaction.

14. A data processing apparatus as claimed in claim 4, wherein:
   said at least one functional unit is arranged to output to the interconnect interface unit the outbound payload information to be pushed onto the at least one send queue.

15. A data processing apparatus as claimed in claim 4, wherein:
   said interconnect interface unit is arranged, on popping said inbound payload information from the at least one receive queue, to output that inbound payload information to said at least one functional unit for processing of that inbound payload information.

16. A data processing apparatus as claimed in claim 1, wherein the interconnect interface unit further comprises:
   payload information processing circuitry for performing one or more predetermined payload information processing operations when processing of one or more types of transaction.

17. A data processing apparatus as claimed in claim 16, wherein, for said one or more types of transaction, the payload information processing circuitry is arranged to provide one or more items of control information to be included within said outbound payload information.

18. A data processing apparatus as claimed in claim 17, wherein at least one of said one or more items of control information comprise a constant value.

19. A data processing apparatus as claimed in claim 17, wherein said interface controller is arranged to determine at least one of said one or more items of control information from the command issued by said main controller.

20. A data processing apparatus as claimed in claim 16, wherein, for said one or more types of transactions, said payload information processing circuitry is arranged to determine with reference to at least one of said outbound or inbound payload information whether an exception condition exists.

21. A data processing apparatus as claimed in claim 1, wherein if on receipt of one of said commands from the main controller, said interface controller determines, having regard to the queue to which that command relates, that the command cannot currently be processed, the interface controller is arranged to assert a stall request signal to cause the main controller to stall execution of a subsequent instruction.

22. A data processing apparatus as claimed in claim 1, wherein the interface controller is responsive to receipt of an asserted stall signal to ignore the command received from the main controller during the time that the stall signal is asserted.

23. A data processing apparatus as claimed in claim 1, wherein the interface controller is responsive to receipt of an asserted abort signal to complete any non-complete transactions in a predetermined manner without reference to any further command received from the main controller.

24. A data processing apparatus as claimed in claim 23, wherein when the non-complete transactions are completed, the interconnect interface unit is arranged to issue an abort done signal to a source of the asserted abort signal.

25. A data processing apparatus as claimed in claim 1, wherein the interface controller is responsive to a data memory barrier signal being asserted in response to a synchronisation instruction being executed by the main controller, to assert a stall request signal until all outstanding transactions have completed.

26. A data processing apparatus as claimed in claim 1, wherein each of said plurality of queues are FIFO storage structures.

27. A data processing apparatus as claimed in claim 26, wherein the number of entries in each FIFO is chosen having regard to a number of pending transactions to be handled by the interconnect interface unit.

28. A data processing apparatus as claimed in claim 1, wherein the interconnect protocol is a multi-channel protocol providing multiple channels of communication, and each queue is arranged to interface with at least one channel.

29. A data processing apparatus as claimed in claim 28, wherein within each channel the outbound or inbound payload information is transferred in accordance with a pair of handshake signals, and the interconnect port provides a handshaking component for each of said plurality of queues for generating one of said handshake signals.

30. A data processing apparatus as claimed in claim 28, wherein said multi-channel protocol is the AXI protocol providing five separate channels of communication.

31. A data processing apparatus as claimed in claim 1, wherein said data processing apparatus is a data engine.

32. A method of connecting a data processing apparatus to interconnect circuitry to enable the data processing apparatus to act as a master device to initiate transactions conforming to an interconnect protocol associated with the interconnect circuitry, wherein each transaction comprising an address transfer issued by the master device to a slave device connected to the interconnect circuitry. and one or more data transfers between the master device and said slave device, each transfer from the master device comprising outbound payload information. and each transfer to the master device comprising inbound payload information, the interconnect protocol controlling routing of the outboard and inboard payload information through the interconnect circuitry, the method comprising the steps of:

executing within a main controller of the data processing apparatus a programmable sequence of instructions including a transaction sequence of instructions used to process a transaction to be initiated by the data processing apparatus, the transaction sequence of instructions being programmed dependent on the interconnect protocol;

providing within an interconnect interface unit of the data processing apparatus a plurality of queues including at least one send queue for issuing the outbound payload information to the interconnect circuitry and at least one receive queue for receiving the inbound payload information from the interconnect circuitry;

pushing the outbound payload information onto the at least one send queue and popping the inbound payload information from the at least one receive queue under the control of commands issued by the main controller when executing said transaction sequence of instructions; and communicating with the interconnect circuitry via an interconnect port in order to output outbound payload information from the at least one send queue and receive inbound payload information for placing on the at least one receive queue.

33. A data processing apparatus for connection to interconnect circuitry, the data processing apparatus comprising a master means for initiating transactions conforming to an interconnect protocol associated with the interconnect circuitry, wherein each transaction comprising an address transfer issued by the master means to a slave device connected to the interconnect circuitry, and one or more data transfers between the master means and said slave device, each transfer from the master means comprising outbound payload information. and each transfer to the master means comprising inbound payload information, the interconnect protocol controlling routing of the outboard and inboard payload information through the interconnect circuitry, said apparatus comprising:

main controller means for executing a programmable sequence of instructions including a transaction sequence of instructions used to process a transaction to be initiated by the data processing apparatus, the transaction sequence of instructions being programmed dependent on the interconnect protocol; and interconnect interface means comprising:

a plurality of queue means including at least one send queue means for issuing the outbound payload information to the interconnect means and at least one receive queue means for receiving the inbound payload information from the interconnect means;

interface controller means for pushing the outbound payload information onto the at least one send queue means and popping the inbound payload information from the at least one receive queue means under the control of commands issued by the main controller means when executing said transaction sequence of instructions; and interconnect port means for communicating with the interconnect means in order to output outbound payload information from the at least one send queue means and receive inbound payload information for placing on the at least one receive queue means.

* * * * *